United States Patent [19]

Bow et al.

[11] 4,292,463
[45] Sep. 29, 1981

[54] CABLE SHIELDING TAPE AND CABLE

[75] Inventors: Kenneth E. Bow, Lake Jackson, Tex.; Thomas H. Lyon, Midland, Mich.

[73] Assignee: The Dow Chemical Company, Midland, Mich.

[21] Appl. No.: 76,035

[22] Filed: Sep. 17, 1979

Related U.S. Application Data

[63] Continuation-in-part of Ser. No. 860,368, Dec. 14, 1977, abandoned, which is a continuation-in-part of Ser. No. 673,842, Apr. 5, 1976, abandoned.

[51] Int. Cl.$^3$ .............. B32B 15/08; H01B 7/18; H01B 7/22
[52] U.S. Cl. .................. 174/107; 428/344; 428/345; 428/349; 428/377; 428/379; 428/383; 428/463; 428/461; 174/110 V
[58] Field of Search .......... 428/377, 379, 383, 344, 428/345, 347, 349, 461, 463; 174/105, 107, 36, 102 R

[56] References Cited

U.S. PATENT DOCUMENTS

| | | | |
|---|---|---|---|
| 3,321,572 | 5/1967 | Garner | 174/105 R |
| 3,325,589 | 6/1967 | Mildner | 174/36 X |
| 3,379,824 | 4/1968 | Kempf | 174/105 R |
| 3,484,539 | 12/1969 | Glander et al. | 174/107 |
| 3,507,978 | 4/1970 | Jachimowicz | 174/105 R |
| 3,586,756 | 6/1971 | Garner et al. | 174/107 |
| 3,622,683 | 11/1971 | Roberts et al. | 174/107 X |
| 3,676,566 | 7/1972 | McBride | 174/36 |
| 3,681,515 | 8/1972 | Mildner | 174/36 |
| 3,703,605 | 11/1972 | Dembiak et al. | 174/36 X |
| 3,790,694 | 2/1974 | Portinari | 174/107 X |
| 3,795,540 | 3/1974 | Mildner | 174/105 R |
| 3,826,862 | 7/1974 | Ichiba | 428/463 |
| 3,950,605 | 4/1976 | Hori et al. | 174/107 |
| 3,964,945 | 6/1976 | Everhart et al. | 174/107 |
| 4,049,904 | 9/1977 | Hori et al. | 428/463 |

*Primary Examiner*—Lorraine T. Kendell
*Attorney, Agent, or Firm*—Tai-Sam Choo

[57] ABSTRACT

An improved corrosion resistant cable shielding tape adapted for use in electrical power and communications cables comprising a metal strip having a deformation resistant layer of polymeric resinous material tightly adhered to at least one side thereof, the deformation resistant layer having a deformation temperature of at least about 270° F. The deformation resistant layer resists abrasion and penetration at the temperatures and pressures normally associated with cable manufacture, installation and/or service use. The deformation resistant layer must be tightly adhered to the metal strip to prevent delamination when exposed to a corrosive environment and to the mechanical forces exerted by metal corrosion products, thereby restricting the path of corrosive attack to the exposed metal edges of the shielding tape. Additional layers of polymeric resinous materials may be included in the multilayered structure of the cable shielding tape such as adhesive and/or heat seal layers. A cable manufactured with the improved corrosion resistant cable shielding tape comprises a core of at least one insulated conductor surrounded by a shield formed from the corrosion resistant cable shielding tape which in turn is surrounded by an outer plastic jacket.

16 Claims, 11 Drawing Figures

CABLE SHIELDING TAPE AND CABLE

CROSS REFERENCE

This application is a continuation-in-part of the co-pending application Ser. No. 860,368, filed Dec. 14, 1977, now abandoned, which application is a continuation-in-part of the application Ser. No. 673,842, filed Apr. 5, 1976, now abandoned.

BACKGROUND OF THE INVENTION

1. Field of the Invention

This invention relates to new and useful improvements for electrical cables adapted for use in supplying electrical power and communications and, more particularly, to an improved corrosion resistant cable shielding tape forming a part of such cables. More specifically, the present invention relates to cable shielding tapes comprising a relatively thin metal strip with one or more layers of polymeric resinous material adhered to at least one side thereof.

2. Description of the Prior Art

In the art of designing and constructing electrical cables, especially telecommunication cables such as telephone cables, it is known to assemble insulated conductors in a core and surround it by shield and jacket components. A well known telephone cable design of such construction is referred to in the art as an "Alpeth" cable. This type of cable is more fully described by F. W. Horn et al. in the paper "Bell System Cable Sheaths Problems and Designs" in A. I. E. E. Proceedings 1951, Volume 70. The shielding tape of the "Alpeth" cable is formed of a layer of bare aluminum having a thickness of about 8 mils which is usually corrugated transversely prior to being wrapped about the cable core. The corrugations impart greater flexibility to the cable and permit bending of the cable without wrinkling or rupturing of the shielding tape.

The term "shield, screen, or shielding tape" as used herein means a relatively thin layer of any metal, bare or coated, which can provide mechanical protection and electrostatic and electromagnetic screening for the conductors in the core of electrical power and communication cables.

When telephone cables are installed underground by being buried directly in soil, the outer jacket of such cables, which is formed of a polymeric resinous material such as polyethylene, may be subjected to damage due to the rigors of installation, and by rocks, rodents, lightning, frost, or dig-ins following the installation. The underlying shielding tapes can thereby be exposed to sub-surface water and the attendant potential for corrosion.

Where the outer jacket of such cables is formed from a polymeric resinous material such as polyethylene, the jacket is not well adhered to the shielding tape of bare metal. The outer plastic jacket is known to slip over the shielding tape and to fold up into shoulders as the cables are pulled through ducts or placed into trenches. The shielding tape is also known to kink, curl or twist during installation causing metal fatigue in the tape and, in extreme cases, rupture of the tape because of mechanical bending stresses exerted thereon.

In order to improve the corrosion resistance of a shielding tape of bare metal, a special adhesive polyethylene coating may be applied to cover one or both sides of the metallic strip as taught in U.S. Pat. Nos. 3,233,036 and 3,795,540. Such shielding tapes are widely used in the manufacture of electrical power and communications cables. The adhesive polyethylene used for this film contains reactive carboxyl groups which have the ability to develop firm adhesion to the metallic strip and also to the overlying polyethylene jacket. The metal component of such shielding tapes provides electrostatic screening and mechanical strength to the cable; the coating of the polymeric resinous material, e.g., ethylene acrylic acid (EAA) copolymer, provides bondability, sealability and corrosion protection to the metal component.

When a polyethylene jacket is extruded over the metallic strip coated with the adhesive polyethylene film, the heat from the semi-molten polyethylene jacket bonds the film coated metal strip to the jacket, forming a unitized construction which combines the strength of the metal strip component with the elongation and fatigue resistance of the polyethylene jacket component. Such cable constructions are referred to in the art as "Bonded Jacket" cable designs. If the heat content of the extruded polyethylene is sufficiently high, the shielding tape could become hot enough so that the overlapped portions of the shielding tape bond together at the seam, thereby forming a sealed tube or pipe around the core of the cable. The "Bonded Jacket" cable with a sealed seam has improved resistance to moisture penetration into the cable core. This cable construction also has been shown to have the greater mechanical strength necessary to withstand repeated bending of the cable, i.e. reducing the occurrences of kinking and fatigue failures of the shielding tape resulting from bending stresses during installation. Further, the effects of stresses induced by the temperature cycles experienced by cables under service conditions are reduced.

The thin plastic coating protects the underlying metal to some degree from corrosion by limiting the area over which such corrosion can occur or by preventing contact between the metal and the sub-surface water. The coating should be tightly bonded to the metal to resist significant delamination therefrom during exposure to the corrosive water and the mechanical forces exerted by the formation of voluminous metal corrosion products, thereby restricting the path of corrosive attack to the exposed metal edges of the shielding tape.

Recently, examination of several commercial cables utilizing polymer resinous material coated shielding tapes representative of the prior art has revealed, however, that the coatings on such tapes are damaged during cable manufacture exposing numerous corrodible bare spots on the surfaces of the metal strip. More specifically, when a polyethylene jacket is extruded over a plastic coated metal shielding tape, the heat from the molten polyethylene jacket softens or melts the polymeric resinous material coating to obtain a bond to the jacket and a sealed seam. While the coating on the metal tape is in such softened or molten state, it is penetrated or abraded by the smooth, corrugated or embossed core wraps, by the seams of the tape itself, by the binder tapes, and/or by the weight of the core itself, thereby exposing numerous corrodible bare spots on the surfaces of the metal strip. As a result, the corrosion rate at the damaged spots may be accelerated due to an unfavorable ratio of the anodic and cathodic areas of bare and coated metal. Furthermore, corrosion which propagates circumferentially between damaged spots may prematurely destroy the longitudinal continuity of the shielding tape which, in turn, could render the cable inoperative. Since telephone cables are expected to have a long service life, corrosion of shielding tapes which can lead to premature cable failures is indeed a serious technical and financial problem for the wire and cable industry. The problem of coating damage has not been recognized until the present invention because of the industry's preoccupation with other major technical design problems. One such problem was the need to develop thermal barrier materials to protect the cable core from heat damage. Another problem was associated with the introduction of fully-filled telephone cable designs wherein the cable core is filled with a grease-like compound to prevent ingress and migration of water.

The corrodible bare spots may occur on either side of the shielding tape but the problem is particularly critical with the use of corrugated metallic strips where it has been observed that the penetration and/or abrasion damage exposing the bare metal is concentrated on the raised corrugated surfaces of the shielding tape disposed toward the core. A corrosive attack on this type of circumferentially concentrated damaged area on the corrugated metal strip will quickly destroy the longitudinal electrical function of the shielding tape. In order to maintain the prior art criterion of restricting corrosion to the shielding tape edges, it is now recognized that penetration and/or abrasion resistance of the plastic coatings is required, in addition to delamination resistance, to insure that corrosion is generally confined to the edges of the shielding tape instead of being extended over the entire surface thereof.

Although there is no known prior art directly concerned with overcoming the above identified problems, the following prior patents specifically referred to hereinbelow and in Table II illustrate the closest known prior art in the plastic coated shielding tape technology.

U.S. Pat. No. 3,586,756 and U.S. Pat. No. 3,950,605 (Example 3 and 6—Table II) disclose shielding tapes comprising a metal strip having an adhesive polymer coating adhered to at least one side of the metal strip. However, these prior patents do not provide for a deformation resistant layer of a polymeric resinous material composition having a deformation temperature of at least 270° F. The coating on such tapes will be deformed during cable manufacture exposing numerous corrodible bare spots on the surfaces of the metal strip.

U.S. Pat. No. 3,507,978 (Example 4—Table II) teaches a shielding tape comprising a metal foil having layers of a copolymer such as ethylene/acrylic acid chemically bonded to both sides of the metal foil and an additional layer of high density polyethylene bonded to one of the copolymer layers. However, there is no teaching or suggestion in U.S. Pat. No. 3,507,978 of the damage problem overcome by the present invention and examination of commercial cables incorporating such a shielding tape also illustrates that penetration and/or abrasion of the high density polyethylene layer occurs at current cable manufacturing conditions.

U.S. Pat. No. 3,379,824 (Example 8—Table II) teaches a shielding tape comprising a three layer structure with an aluminum foil laminated between two polypropylene layers or a polypropylene layer and a polyethylene terephthalate layer. Again, there is no teaching or suggestion of the damage problem overcome by the present invention. In addition, although these plastic layers will resist penetration and abrasion, they do not provide corrosion protection when a corrosive environment is present in a cable since both polypropylene and polyethylene terephthalate are highly inert and can develop only a poor mechanical bond to the metal strip based on friction adhesion. Therefore, both the polypropylene and polyethylene terephthalate layers will easily delaminate under exposure to corrosive conditions and the mechanical forces exerted by metal corrosion products. Furthermore, neither polypropylene nor polyethylene terephthalate can achieve the bonded jacket and sealed seam.

U.S. Pat. No. 3,325,589 (Example 9 to 11—Table II) discloses a plastic coated metal shielding tape comprising a metal strip having an adhesive layer immediately adjacent to the metal strip and an additional polyester or polypropylene layer adhered to one side of the metal strip. Such a shielding tape was subjected to simulated conditions of cable manufacture and a laboratory corrosion test. It was found that the tape did not provide satisfactory corrosion resistance to the metal, i.e., the path of corrosive attack was not confined to the exposed metal edges. The adhesive layer was deformed from pressure exerted through the polypropylene or polyester layer thereby exposing bare aluminum spots. Corrosion was taking place on these bare spots after subjecting the cable to a standard corrosion test with sodium hydroxide (NaOH), as hereinafter defined in this specification, due to the infiltration of the NaOH between the adhesive layer and the polypropylene (PP) or polyester layers.

U.S. Pat. No. 3,790,694 (Example 9—Table II) discloses a polypropylene layer adhesively bonded to a metal strip. The patent does not specify the use of any particular adhesive. Therefore, ethylene acrylic acid (EAA) copolymer, the best known metal adhesive in the industry today, was used to make shielding tapes according to the teachings of that patent. When subjected to simulated conditions of cable manufacture and a standard corrosion test with NaOH as hereinbefore defined in the specification, the shielding tapes were found to give similar results to those of U.S. Pat. No. 3,325,589: The EAA adhesive layer does not adhere tightly to the polypropylene layer thus allowing the infiltration of NaOH solution therebetween. The patent teaches bonding of the jacket, a screen, and composite tapes together during extrusion of the cable jacket. Since the thermoplastic coatings on the screen and composite tapes must be above their melting points to effect bonding, they were found to be damaged a priori. Thus, this prior art patent also failed to recognize the problem of coating damage on shielding tapes. U.S. Pat. Nos. 3,325,589 and 3,790,694, are related to a heat resistant core wrap (thermal barrier) and a fully filled cable, respectively.

U.S. Pat. No. 3,321,572 (Example 13—Table II) and U.S. Pat. No. 3,622,683 (Example 8—Table II) disclose, inter alia, shielding tapes comprising a metal strip having a polymeric resinous material coating adhered to at least one side thereof and capable of resisting deformation at an elevated temperature. However, these shielding tapes were found to fail the adhesion requirement of the present invention. In these tapes, it was found that the path of corrosive attack was not confined to the exposed edges of the metal strip because of the infiltration of the corrosive element between the polymer coating and the metal strip.

U.S. Pat. No. 3,484,539 teaches the adhesion of a heat sealable layer, such as, for example, polyvinyl chloride to a polymer layer capable of resisting deformation at cable-forming temperatures. However, the polymer layer of this patent, having adhered thereto a heat sealable layer, it not "tightly bonded" to the metal strip and is thus open to corrosive attack due to the infiltration of corrosion causing liquids when the cable jacket is damaged.

SUMMARY OF THE INVENTION

The present invention provides an improved corrosion resistant cable shielding tape comprising (1) a metal strip having tightly and directly adhered to one side thereof a first adhesive layer composed of a copolymer of ethylene and from about 2 to about 20 percent based on copolymer weight of an ethylenically unsaturated carboxylic acid; and (2) a first deformation resistant layer composed of a polymeric resinous material tightly adhered to said first adhesive layer, said first deformation resistant layer having a deformation temperature of at least about 270° F. The adhesive bond between the metal strip and the first adhesive layer and between the first adhesive layer and the first deformation resistant layer is at least 2.2 pounds per inch of shielding tape width as determined by the test method disclosed herein after aging for seven (7) days in deionized water maintained at a temperature of 70° C.

In another embodiment, a second deformation resistant layer and/or other layers of polymeric resinous materials is included in the shielding tape thereby providing a multilayered structure having a combination of desirable functional characteristics. For example, deformation resistant layers of polymeric resinous material are tightly bonded to both sides of the metal strip, if desired, to provide penetration and/or abrasion resistance on both sides of the shielding tape.

In a further embodiment, glue layers of polymeric resinous materials having good bonding characteristics to the adhesive, the deformation resistant and the heat seal layers are used to tightly bond the deformation resistant layer to the adhesive layer, or the heat seal layer when direct adhesion of the same is insufficient to provide adequate corrosion protection for the metal strip and desirable functionalities to the resultant cable shielding tape.

In another embodiment, heat seal layers of thermoplastic polymeric resinous material are included in the shielding tape of this invention to provide a hermetically sealed shield seam in the cable structure and to provide a good bond between the cable shielding tape and outer plastic jacket of the cable.

In a further embodiment, an adhesive/heat seal layer of thermoplastic polymeric resinous material having both good metal bonding and heat seal characteristics is tightly bonded directly to one side of the metal strip.

In yet another embodiment, plastic coated metal shielding tapes are made without the use of solvent or water based adhesives which require expensive processes of multiple steps and suffer from environmental or toxicological restrictions.

The combined layers of polymeric resinous materials described above should have a high electrical resistivity, high resistance to chemicals, moisture and thermal deformation and exceptionally good bonding to the metal strip thereby being able to withstand the rigors of manufacturing processes as well as to resist delamination in a corrosive environment.

The shielding tape of this invention must meet both the adhesion or bonding and deformation resistance requirements to provide satisfactory corrosion protection to the shielding tape by restricting the path of corrosive attack to the exposed metal edges of the metal strip.

More specifically, as herein defined, "metal strip" means a relatively thin layer of any metal which has good electrical or mechanical properties useful in electrical power and communications cables.

As herein defined, the term "deformation resistant layer" means a layer of polymeric resinous material that substantially resists penetration and/or abrasion of the coating on the metal strip at the temperatures and pressures normally associated with cable manufacture, installation and/or service use.

As herein defined, the term "tightly adhered" means chemically and/or mechanically bonding the deformation resistant layer to the metal strip, either directly or indirectly with an adhesive layer, or by bonding an adhesive/heat seal layer directly to the metal strip, to prevent significant delamination of the deformation resistant and adhesive/heat seal layers from the metal strip under exposure to corrosive conditions and the resulting mechanical forces exerted by the metal corrosion products, thereby restricting the path of corrosive attack to the exposed metal edges of the shielding tape. Numerically, the tightly adhered layers have an adhesion value of at least 2.2 pounds per inch of shielding tape width at the interface thereof as determined by the test method described herein after aging for seven (7) days in deionized water maintained at a temperature of 70° C.

"Adhesive layer", as herein defined, means a layer of polymeric resinous materials having good bonding characteristics to the metal strip and deformation resistant layer and the plastic jacket of the electrical cable.

As herein defined, "glue layer" means a layer of polymeric resinous materials having good bonding characteristics to the adhesive, the deformation resistant and the heat seal layers. The glue layer is used as an intermediary layer between the deformation resistant layer and the adhesive or heat seal layers to ensure tight adhesion therebetween. The glue layer is needed when direct adhesion between the deformation resistant layer and the adhesive or heat seal layers is insufficient to provide adequate corrosion protection for the metal strip and desirable functionalities to the resultant cable shielding tape.

"Heat seal layer", as herein defined, means a layer of thermoplastic polymeric resinous materials having a sealing temperature of 250° F. or lower and, preferably, 230° F. or lower which will easily seal to itself, or other polymeric resinous materials such as, for example, those materials forming the outer plastic jacket of a cable.

"Adhesive/heat seal layer", as herein defined, means a layer of thermoplastic polymeric resinous materials having both good metal bonding and heat seal characteristics for the adhesive and heat seal layers which will tightly adhere to the metal strip.

Improved cables adapted for use in supplying electrical power or communications can be constructed with the improved corrosion resistant cable shielding tape described above. Such cables comprise a core of at least one insulated conductor, a shield of the improved corrosion resistant cable shielding tape surrounding the core, and an outer plastic jacket surrounding the tape. The deformation resistant layer of the shielding tape may be positioned in the direction of the core, in the direction of the outer jacket or in both directions to overcome penetration and/or abrasion damage during manufacture and/or during service of the cable.

BRIEF DESCRIPTION OF THE DRAWINGS

The invention is further understood by reference to the accompanying drawings in which like characters of reference designate corresponding materials and parts throughout the several views thereof, in which.

DETAILED DESCRIPTION OF THE PREFERRED EMBODIMENTS

Figure 1:
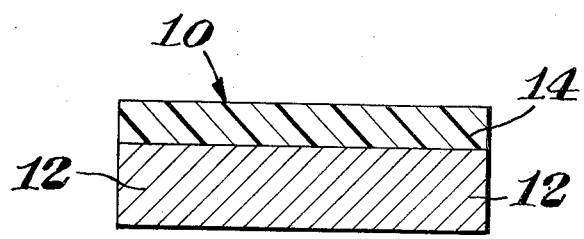
FIG. 1 is a partial cross-sectional view of a plastic coated metal shielding tape constructed according to the principles of the present invention.

The metal strip which is used in accordance with this invention may have a thickness from 0.2 to 25 mils and, more preferably, from 2 to 15 mils. The metal strip may be formed, for example, from aluminum, aluminum alloys, alloy-clad aluminum, copper, surface modified copper, bronze, steel, tin free steel, tin plate steel, aluminized steel, stainless steel, copper-clad stainless steel, terneplate steel, galvanized steel, chrome or chrome treated steel, lead, magnesium or tin. These metals may also be surface treated or have thereon surface conversion coatings.

The deformation resistant layer which is used in accordance with this invention may have a thickness from 0.1 to 15 mils and, more preferably, from 0.5 to 2.0 mils. Beneficially, the deformation resistant layer may be formed from any polymeric resinous material which will provide a layer deformation temperature of at least about 270° F. such as, for example, polypropylene, carboxyl modified polypropylene, polyamides, polyethylene terephthalate, fluoropolymers, 1-4 di-methyl pentene polymers, ethylene/propylene copolymers, stereo regular polystyrene, flexible thermoset polymeric resinous materials, vinylidene chloride polymers, or irradiated carboxyl modified olefin polymers. These polymeric resinous materials may be blended with, for example, low or high density polyethylene, ethylene/ethyl acrylate copolymers, ethylene/vinyl acetate copolymers, carboxyl modified ethylene polymers, ethylene/acrylic acid copolymers, ionic olefin polymers, or chlorinated polyethylene, provided the layer deformation temperature is at least about 270° F. Flexible thermoset polymeric resinous materials such as, for example, polyurethanes may also be used provided the 270° F. deformation temperature is achieved. Polymeric materials which are normally not suitable for use as the deformation resistant layer such as, for example, low density polyethylene, may also be used provided such materials are irridiated with a sufficient amount of high energy ionization radiation, thereby increasing the deformation temperature of such material to at least about 270° F.

The adhesive layer may have a thickness from 0.1 to 10 mils, preferably from 0.3 to 2.5 mils. Such a layer may be formed from any thermoplastic polymeric resinous material which will tightly bond the deformation resistant layer to the metal strip. Copolymers of ethylene and ethylenically unsaturated carboxylic acids readily form a strong adhesive bond with metals and are preferred in achieving beneficial results of the present invention. The adhesive polymer which is beneficially used in accordance with this invention is a normally solid thermoplastic polymer of ethylene modified by monomers having reactive carboxylic acid groups, particularly a copolymer or a major proportion of ethylene and a minor proportion, typically from 1 to 30, preferably from 2 to 20 percent by weight, of an ethylenically unsaturated carboxylic acid. Specific examples of such suitable ethylenically unsaturated carboxylic acids (which term includes mono- and polybasic acids, acid anhydrides, and partial esters of polybasic acids) are acrylic acid, methacrylic acid, crotonic acid, fumaric acid, maleic acid, itaconic acid, maleic anhydride, monomethyl maleate, monoethyl maleate, monomethyl fumarate, monoethyl fumarate, tripropylene glycol monomethyl ether acid maleate, or ethylene glycol monophenyl ether acid maleate. The carboxylic acid monomer is preferably selected from $\alpha,\beta$-ethylenically unsaturated mono- and polycarboxylic acids and acid anhydrides having from 3 to 8 carbon atoms per molecule and partial esters of such polycarboxylic acid wherein the acid moiety has at least one carboxylic acid group and the alcohol moiety has from 1 to 20 carbon atoms. The copolymer may consist essentially of ethylene and one or more of such ethylenically unsaturated acid comonomers or can also contain small amounts of other monomers copolymerizable with ethylene. Thus, the copolymer can contain other copolymerizable monomers including an ester of acrylic acid. The comonomers can be combined in the copolymer in any way, e.g., as random copolymers, as block or sequential copolymers, or as graft copolymers, preferably as random copolymers. Materials of these kinds and methods of making them are readily known in the art.

The glue layer may have a thickness from 0.1 to 5 mils, preferably from 0.2 to 1.0 mil. Such a layer may be formed from any thermoplastic polymeric resinous material which will tightly bond the deformation resistant layer to either the adhesive layer or the heat seal layer. The glue layer may be formed from, for example, blends of polypropylene and ethylene acrylic acid copolymer, blends of styrene-ethylene-butylene-styrene block copolymers, hydrocarbon resins and polyethylenes and ethylene vinyl acetate copolymers.

Beneficially, the heat seal layer may have a thickness from 0.1 mils to 10 mils and, preferably, from 0.3 mil to 1 mil. The heat seal layer may be formed from, for example, low or high density polyethylene, ethylene/ethyl acrylate copolymers, ethylene/vinyl acetate copolymers, carbonxyl modified ethylene polymers, or blends of the above.

The adhesive/heat seal layer may have a thickness from 0.1 mil to 10 mils and, more preferably, from 1 mil to 3 mils. The adhesive/heat seal layer may be formed from, for example, carboxyl modified olefin polymers, ionic olefin polymers, blends of carboxyl modified olefin polymers or blends of ionic olefin polymers.

Referring now to the drawings, FIG. 1 illustrates an improved corrosion resistant cable shielding tape 10 comprising a metal strip 12 having a deformation resistant layer 14 formed of a polymeric resinous material such as a blend of 50 weight percent polypropylene and 50 weight percent ethylene/acrylic acid copolymer tightly bonded to one side thereof. In order to provide corrosion protection for the metal strip 12, shielding tape 10 should be used in cable constructions having a plastic outer jacket formed of an adhesive composition which will tightly bond to the metal strip 12 on the side opposite to that of layer 14.

Figure 2:
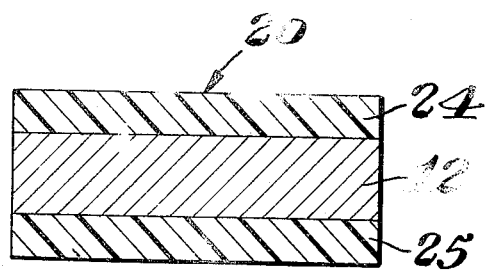
FIGS. 2-9 are partial cross-sectional views illustrating modified plastic coated metal shielding tapes constructed according to the principles of the present invention.

FIG. 2 illustrates a modified cable shielding tape 20 having a deformation resistant layer 24 like layer 14 of FIG. 1 tightly bonded to metal strip 12. Layer 25 which is tightly bonded to the opposite side of strip 12 may be a deformation resistant layer like layer 24 or may be an adhesive/heat seal layer formed of an ethylene/acrylic acid copolymer.

Figure 3:
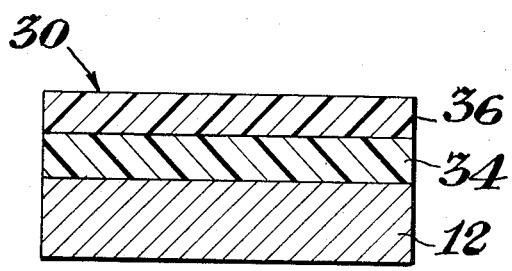

FIG. 3 illustrates another modified cable shielding tape 30. The metal strip 12 may have a deformation resistant layer 34 like layer 14 of FIG. 1 tightly bonded to one side thereof and a heat seal layer 36 formed of low density polyethylene adhered to layer 34. Alternatively, layer 36 may be a deformation resistant layer formed of a material such as nylon which will not tightly bond directly to the metal strip 12 with sufficient adhesion to provide corrosion protection and layer 34 may be an adhesive layer formed of a material such as an ethylene/acrylic acid copolymer. Like shielding tape 10 of FIG. 1, shielding tape 30 should be used in cable constructions which have a plastic outer jacket formed of an adhesive composition to insure corrosion protection for the metal strip 12.

Figure 4:
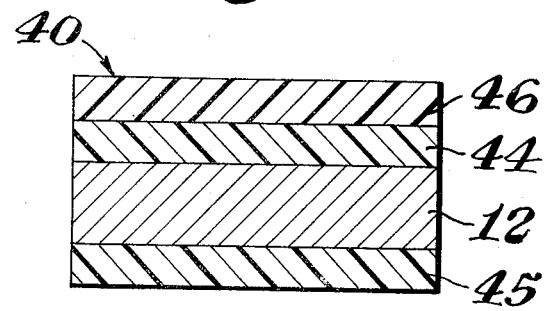

FIG. 4 illustrates still another modified cable shielding tape 40. There are four possible structures of shielding tape 40 useful in accordance with this invention. Layer 45 may be a deformation resistant layer like layer 14 of FIG. 1 for two of the possible structures or an adhesive/heat seal layer like layer 25 of FIG. 2 for the other two structures. Layer 44 may also be a deformation resistant layer like layer 14 of FIG. 1 when it will tightly bond directly to the metal strip 12 or it may be an adhesive layer formed of an ethylene/acrylic acid copolymer which in turn is used to tightly bond a deformation resistant layer 46 like layer 36 of FIG. 3 that will not tightly bond directly to the metal strip 12. When layer 44 is a deformation resistant layer tightly bonded to the metal strip 12, layer 46 is beneficially a heat seal layer like layer 36 of FIG. 3.

Figure 5:
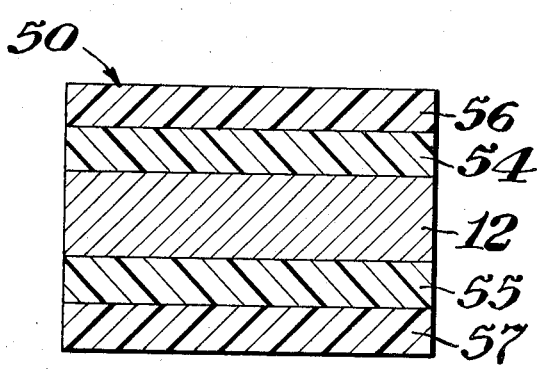

FIG. 5 illustrates still another modified cable shielding tape 50. There are three possible structures of tape 50 useful in accordance with this invention. First, two deformation resistant layers 56 and 57 like layer 36 of FIG. 3 which will not tightly bond directly to the metal strip 12 may be tightly bonded to the strip 12 with adhesive layers 54 and 55 like layer 34 of FIG. 3. Second, the remaining two possible structures may have a deformation resistant layer 55 like layer 14 of FIG. 1 tightly bonded to the metal strip 12 and a heat seal layer 57 like layer 36 of FIG. 3 bonded to layer 55. On the opposite side of the metal strip 12 there may be a deformation layer bonded directly to the strip 12 and a heat seal layer 56 like layer 36 of FIG. 3 bonded to layer 54 or, in the alternative, there may be a deformation resistant layer 56 like layer 36 of FIG. 3 which will not tightly bond directly to the metal strip 12 that is tightly bonded to the strip 12 with an adhesive layer 54 like layer 34 of FIG. 3.

Figure 6:
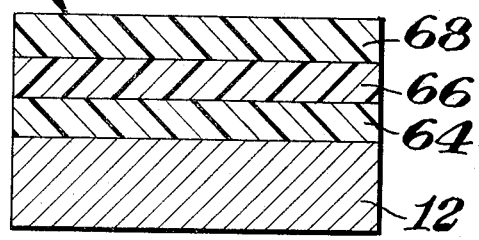

FIG. 6 illustrates a further modified cable shielding tape 60. A deformation resistant layer 66 like layer 36 of FIG. 3 which will not tightly bond directly to the metal strip 12 is tightly bonded to the strip 12 with an adhesive layer 64 like layer 34 of FIG. 3. A heat seal layer 68 formed of an ethylene/acrylic copolymer is bonded to layer 66. Like shielding tapes 10 and 30, shielding tape 60 should be used in cable constructions which have a plastic outer jacket formed of an adhesive composition to insure corrosion protection for the metal strip 12.

Figure 7:
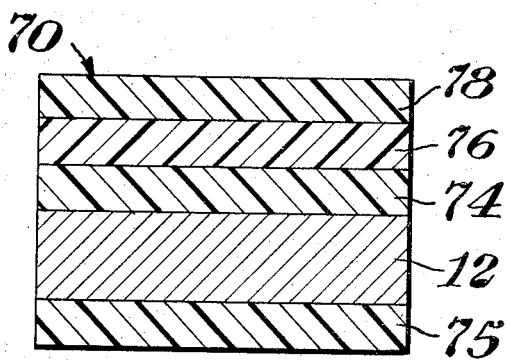

FIG. 7 illustrates a still further modified cable shielding tape 70. The adhesive layer 74, deformation resistant layer 76 and heat seal layer 78 are the same as the corresponding layers 64, 66 and 68 found in FIG. 6. Layer 75 may be a deformation resistant layer like layer 14 of FIG. 1 or, in the alternative, an adhesive/heat seal layer like layer 25 of FIG. 2 tightly bonded directly to the metal strip 12.

Figure 8:
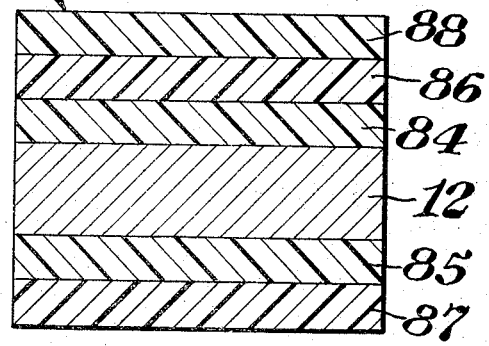

FIG. 8 illustrates a still further modified cable shielding tape 80. The adhesive layer 84, deformation resistant layer 86 and the heat seal layer 88 are the same as the corresponding layers 64, 66 and 68 found in FIG. 6. On the opposite side of the metal strip 12 there may be a deformation resistant layer 86 like layer 14 of FIG. 1 tightly bonded directly to the strip 12 and a heat seal layer 87 like layer 36 of FIG. 3 bonded to layer 85 or, in the alternative, there may be a deformation resistant layer 87 like layer 36 of FIG. 3 which will not tightly bond directly to the metal strip 12 that is tightly bonded to the strip 12 with an adhesive layer 85 like layer 34 of FIG. 3.

Figure 9:
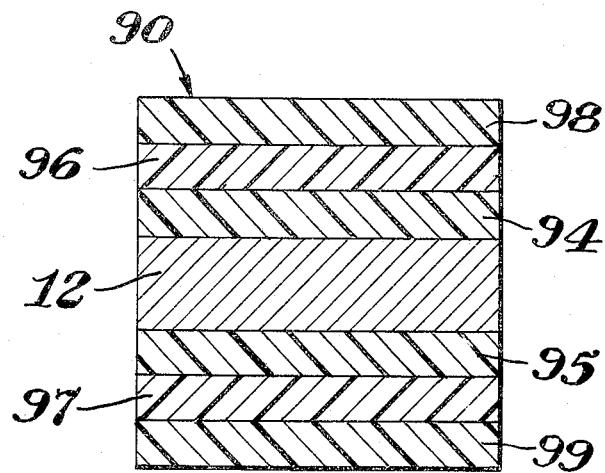

FIG. 9 illustrates a final modified cable shielding tape 90. The adhesive layers 94 and 95, deformation resistant layers 96 and 97, and the heat seal layers 98 and 99 are the same as the corresponding layers 64, 66 and 68 found in FIG. 6.

Figure 11:
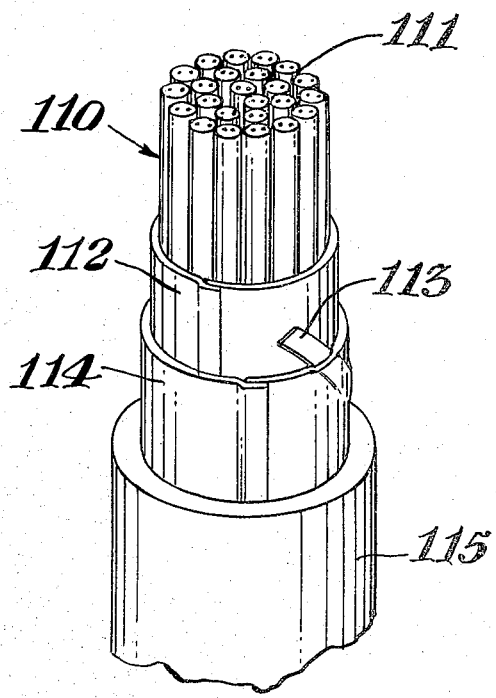
FIG. 11 is a cut-away perspective view of an end of a communications cable with multi-pair insulated conductors in the core, plastic coated metal shield. and plastic outer jacket.
Figure 10:
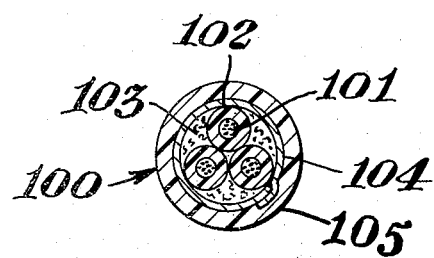
FIG. 10 is a cross-sectional view of a typical power cable with three insulated conductors, a plastic coated metal shield and an outer plastic jacket.

Referring now to FIGS. 10 and 11, a typical three-conductor power cable 100 and multi-pair conductor communications cable 110 are illustrated. The power cable 100 has low resistance metal conductors 101, which can be solid or stranded, usually of copper or aluminum, which are each insulated, usually with an extruded plastic cover 102 of, for example, polyvinyl chloride, chlorinated polyethylene, polyethylene or rubber. Space fillers 103 of, for example, natural fibers or foamed plastic are used to provide a substantially circular core assembly which is enclosed in a shielding tape 104 formed from any one of the shielding tape structures illustrated in FIGS. 1-9. The shielding tape 104 is preferably a longitudinally folded tube with an overlapping seam that may be hermetically sealed by heat sealing the plastic coating(s) of the shielding tape together in the overlapping seam during cable manufacture. An outer plastic jacket 105, usually extruded polyethylene containing stabilizers and carbon black, is beneficially bonded to the shielding tape 104. The communications cable 110 includes an inner core of many pairs of insulated conductors 111 (e.g. plastic coated copper wires) bundled in a plastic core wrap 112 of, for example, polypropylene or polyethylene terephthalate which is securely bound with a binder tape 113. The bundle is enclosed in a shielding tape 114 formed from any one of the shielding tape structures illustrated in FIGS. 1-9. Like the shielding tape 104 of power cable 100, shielding tape 114 is preferably a longitudinally folded tube with a hermetically sealed overlapping seam. An outer plastic jacket 115 preferably of polyethylene is extruded over the shielding tape 114 and is advantageously bonded to the same.

Deformation resistance of a layer of polymeric resinous material is normally tested by means of a penetrometer. However, known penetrometers are designed for coatings (comprising one or more layers of synthetic resinous material) 60 to 125 mils thick and data therefrom do not apply to the coating thicknesses on cable shielding tapes or temperatures and pressures associated with the cable manufacture or use. Therefore, a special penetrometer test was developed to evaluate the ability of relatively thin coatings, i.e., coatings having a thickness of 10 mils or less, on plastic clad metals to resist deformation at elevated temperatures. The special penetrometer consists of a metal block weighing 3.7 pounds onto which a circular ring has been machined. The ring has an outside diameter of 1.5 inches and a thickness of 25 mils. The cutting edge of the ring in contact with the coated shielding tape sample is rounded to a 1/32 of an inch radius and applies a pressure to the sample of 35 pounds per square inch. The testing procedure consists of placing the sample of shielding tape on a base such as a metal plate and then positioning the special penetrometer on the sample with the ring in contact with the coating thereon. An electrical circuit, open because of the coating, is connected between the penetrometer and the metal strip of the sample. Thereafter, the entire assembly is placed in a circulating air oven preheated to 425° F. which increases the temperature of the shielding tape being tested at a rate of approximately 22° F. per minute. When the ring penetrates the coating, the electrical circuit is completed and the temperature of the coating, determined by a thermocouple or other means, is recorded. This temperature is the deformation temperature, for the coating being tested. It has been established that the conditions of this test correlate well with the temperatures and pressures associated with cable manufacturing and/or service use. It has been found that the deformation resistant layer should have a deformation temperature of at least about 270° F. and preferably at least about 280° F. to substantially resist the temperatures and pressures normally associated with cable manufacturing and/or service use.

The degree of adhesion between plastic layers, and between a plastic layer and the metal strip of a shielding tape of this invention, which will satisfy the requirement for "tightly adhered" thereof, should represent a value of at least about 2.2 pounds per inch of tape width by the test method as herein described, preferably at least about 4.4 pounds per inch after immersion of a tape sample in deionized water maintained at a temperature of 70° C. for a period of time of 7 days. The degree of adhesion was determined by preparing a 6 inch wide by 6 inch long by 60 mils thick molding a plastic jacketing or adhesive material using a procedure similar to that described in the U.S.D.A Rural Electrification Administration (REA) Specification PE-200. A sheet of shielding tape of the same dimensions (6 in. × 6 in.) was placed over the molding. A narrow strip of polyester film of 1 mil thickness was placed between the shielding tape and the molding of the jacketing material to prevent bonding to one end of the jacketing material to form a "tab" for use in a tensile strength testing machine. The shielding tape was bonded to the molding using a compression molding press and a molding temperature of 190° C. The molding pressure was 300 pounds per square inch. The heating cycle was as follows: 3 minutes to reach temperature with no pressure; 2 minutes under pressure; and 5 minutes to cool to room temperature. After the shielding tape/jacketing material laminate was prepared, one inch wide samples for bonding tests were cut on a sample cutter. The samples were placed on a tensile testing machine and tested for bond strength as follows: the unbonded portion of the shielding tape was folded back 180°; the sample was inserted into the tensile testing machine with the shielding tape in the upper jaw and the molding of jacketing material in the lower jaw; a rigid metal plate was placed behind the molding to maintain the peeling angle at 180°; and the shielding tape was then separated from the rigid molding of the jacketing material at a crosshead speed of 5 inches per minute. The required force to separate the shielding tape from the molding was recorded as a measure of adhesive strength. The separation can occur at the metal strip/plastic layer interface, or plastic layer/plastic layer interface or plastic layer/jacketing material interface.

Several shielding tapes of plastic coated aluminum were prepared and were tested for corrosion resistance thereof. More specifically, test samples of the shielding tapes having a thickness of about 23 mils, the thickness of aluminum being about 8 mils, and an area of 2 inches by 2 inches were first subjected to a simulated jacketing test, as described hereinafter, and were then immersed in one (1) normal sodium hydroxide (1 N NaOH) solution for 24 hours. Bare aluminum spots on the surfaces of the shielding tapes, which had been exposed by damage to the plastic coatings thereon during the simulated jacketing test, were thereby corroded. The number of corroded spots, which were easily identifiable in the test sample of shielding tape, were counted and recorded as a corrosion damage index thereof. When a one-sided coated laminate, which can be used with an adhesive jacket, is being tested, the uncoated side must be coated with a protective coating, such as ethylene acrylic acid copolymer, prior to the immersion of the laminate in the IN NaOH solution. An index of 0 indicates that no corrosion spots are present while a given number indicates the number of corrosion spots which can be counted on the sample. Test of shielding tapes having poorly bonded plastic coatings thereon often resulted in total dissipation of the metal. In the present invention, a cable shielding tape is considered corrosion resistant if the number of corrosion spots in an area of 4 in$^2$ is equal to or less than eight (8) following the simulated jacketing test, described hereinbelow, and the corrosion test.

The simulated jacketing test was designed to simulate temperature and pressure conditions normally encountered inside a cable, during and following the jacketing operation, in order to study the effects thereof on cable components. The test is particularly well suited to study the effect of the temperature and pressure conditions on the plastic coating or plastic coated shielding tapes. In order to conduct this test, a cylindrical section of a cable having a length of about 2 inches is converted into a rectangular configuration having planar surfaces. The test is carried out using the following procedure: A sample of molded jacketing material of about 2 inches × 2 inches and weighing 13 grams and having a thickness of 100 mils was heated in an oven to a temperature of 425° F.; the jacketing material was removed from the oven after 6 or 7 minutes and within a period of 5 seconds a sample of corrugated shielding tape 2 inches × 2 inches was placed on the jacketing material, a corrugated core wrap of polyester film, a section of a cable core having a generally rectangular configuration and weighing 218 grams, and a 2000 gram weight were then successively stacked on top of the shielding tape; and finally, the entire assembly was placed on a large aluminum block (weighing 955 grams) to cool while the temperature of the core wrap/shield interface was recorded through a thermocouple placed therebetween. The aluminum block provides a heat sink and thereby simulates the cooling bath located downstream of the extruder head, which cooling bath and extruder head are normally present in a cable manufacturing process.

The temperature-time relationships for the shield obtained with this test correlate to those obtained with large pair count cables during extrusion of the jacket/[1]

[1] R. C. Mildner, P. C. Woodland, H. A. Walters and G. E. Clock, entitled, "A Novel Form of Thermal Barrier for Communication Cable," presented at the 14th International Wire and Cable Symposium, Atlantic City, N.J., 1965.

Heat sealability was determined on film samples of the coatings by means of a special seal test. Two samples of film 2 inches wide are placed in contact with each other in a heat sealer apparatus such as a Sentinel Brand, Model 24AS, or equivalent. The temperature of the sealer bar is increased in about 10° F. increments from 190° F. to a temperature sufficient to seal the films together. The temperature at which the films seal to each other is recorded as the minimum seal temperature. The dwell time in seconds for the sealer bar is equal to two thirds the film thickness in mils. The air pressure on the sealer bar is set to 40 psi and the width of the sealer bar is 0.125 inch.

The effect of water blocking "fillers" was tested with samples of plastic coated shielding tapes in which coatings on both sides thereof were exposed to petrolatum filling compounds (Witco 5B) and floodant (Witco 4) at 115.5° C. for two seconds. A percent swell was calculated based on the amount of filler picked up by the coating after the surface thereof was wiped clean of any filler compound. The original weight of the coating was substracted from the weight of the coating after exposure and this difference was divided by the original weight. This number was multiplied by 100 to obtain percent swell. The results of this test are listed in Table IX.

In a "connector stability" test, coated metal samples approximately 2 inches×6 inches were corrugated. Then two Griplok ® connectors were attached to each longitudinal end of the samples. The initial resistance in milli-ohms was measured across the connectors using a Kelvin Bridge. The samples were then given 50 temperature cycles from −40° C. to +60° C., with each cycle being of an 8 hours duration, and the resistance was measured again. The results of these tests are listed in Table X.

The following additional test methods were used:
1. Physical properties of the coating were determined by ASTM D-638.
2. Elmendorf Tear was determined by ASTM D-1922.
3. Melt Index was determined by ASTM D-1238.

Cable shielding tapes of the present invention are readily fabricated utilizing well known laminating or extrusion coating techniques. When the laminating technique is used, the polymeric compositions suitable for the present invention are first converted into either blown or flat films utilizing well known extrusion processes. The resulting films are bonded to a metal strip by heat and pressure to make different cable shielding tapes.

The present invention is not limited by the process used to prepare the films from the compositions suitable for this invention or the technique used to fabricate the shielding tapes therefrom. However, as it is well known in the art, the manner in which these films are prepared can induce some differences in properties thereof. For example, the deformation resistance of these films is, among other things, related to the degree of molecular orientation imparted thereto: a film of a given polymeric composition having a relatively high degree of molecular orientation will characteristically have a relatively high deformation resistance and vice versa. For example, as it is seen in Examples 1 and 15 of Table I, a polymeric composition comprising 50 percent by weight of polypropylene and 50 percent by weight of ethylene acrylic acid copolymer has a deformation temperature of 327° F. when the composition is converted into a film using a blown film process (Example 15) and 291° F. when a flat film process (Example 1) is employed. However, an additional degree of molecular orientation can be imparted to blown or cast films by well known stretching techniques. These films can advantageously be stretched simultaneously in the machine and transverse directions.

When the cable shielding tapes of the present invention are prepared by utilizing the well known extrusion coating technique, a molten polymeric composition of the present invention is forced through a slot in a flat die and is applied directly onto the metal strip. The coating on the shielding tapes prepared by the extrusion coating techniques is known to have about the same degree of molecular orientation as the corresponding flat film of the same polymeric composition.

When the cable shielding tapes of the present invention comprise a plurality of polymeric layers such as, for example, adhesive layer, deformation resistant layer and heat seal layer, it is most advantageous to employ coextrusion techniques in preparing the blown or flat films or in carrying out the extrusion coating step. Such coextrusion techniques are described in U.S. Pat. Nos. 3,860,036 and 3,924,990 and Belgian Pat. No. 660,841.

A preferred method of making a cable shielding tape of the present invention involves the well known post heating step such as the one described in U.S. Pat. No. 3,402,086, the teachings of which are herewith incorporated by reference. Such a post heating step increases the adhesion between the metal strip and the adjacent polymeric layer of the cable shielding tape.

In a particularly advantageous method of making a cable shielding tape of the present invention, the adhesive layer, which is bonded tightly and directly to at least one side of the metal strip, is irradiated with an effective amount of a high energy ionizing radiation. The term "ionizing radiation", as used herein, is a generic term for those radiations having an ionizing capacity, such as electron rays, gamma rays, X-rays, neutron rays and proton rays. Electron rays are preferred for the practice of the present invention but any one of these may be employed, and a further concurrent use of two or more of these activation sources is also permissible. The high energy irradiation procedure imparts a certain degree of cross-linking to the adhesive layer with the attendant increase in the deformation resistance thereof. An "effective amount" of radiation for the purpose of the present invention is the amount of radiation sufficient to increase the deformation temperature of the adhesive layer to at least about 270° F.

Representative examples of the present invention along with deformation temperatures and corrosion index are shown in Table I. Examples 23, 24, and 25 are prepared by extrusion coating EAA and/or LDPE layers onto aluminum. As indicated in Table I, other examples are prepared by laminating cast or blown films of polymer compositions and layers of respective examples to aluminum, copper or tin plate steel. All examples in Table I have been post-heated at a temperature of about 280°–350° F. to increase the adhesion between the metal strip and adjacent polymer layer.

Bonded jacket cables, as shown in Table VII, incorporating these examples have been fabricated on commercial cable manufacturing lines under normal processing conditions.

The penetrometer test for deformation resistance was used to obtain the deformation temperature.

Examples 1, 2, 4 and 6 in Table I show the use of a two component blend as the deformation resistant layer.

Example 5 shows the use of nylon as the deformation resistant layer.

Example 7 shows a functional sample with tin plate steel using a two component blend as the deformation resistant layer.

Examples 8–11 in Table I show the use of a three component blend as the deformation resistant layer.

Example 12 establishes the use of a four component blend as the deformation resistant layer.

Example 13 establishes the lower limit for deformation temperature of a blend of polyethylene with polypropylene at about 270° F.

Example 14 illustrates the use of an adhesive jacket to substantiate the utility of single side coated metals according to FIGS. 1, 3 and 6.

Example 15 illustrates an embodiment in which polypropylene is used as a deformation resistant layer. An EAA-PP blend is used as a glue layer to bond the deformation resistant layer in a first adhesive layer of EAA. A second glue layer of EAA-PP blend and a heat seal layer of EAA can be successively applied to the PP layer to obtain low temperature sealability.

Examples 16–19 are comparative examples and were prepared according to the procedure of this invention. However, the composition of the blend in the deformation resistant layer was selected where it was not sufficient to provide a deformation temperature of at least 270° F.

Example 20 illustrates a functional example with copper. Since copper degrades an EAA coating in the presence of moisture, a copper stabilizer, OABH (oxalic acid bis (benzylidene hydrazide)), has been added to the EAA.

Example 21 illustrates a functional example with ionomer (Surlyn® 1652, 11% MAA) as the metal adhesive layer.

Example 22 illustrates a functional example with an EAA-polyethylene blend as the metal adhesive layer.

Examples 23–35 illustrate functional examples with crosslinked coatings which were unusual in that they maintained their bondability, sealability, and corrosion protection qualities after irradiation.

Examples 26 and 27 illustrate functional examples with vinylidene chloride polymer as the deformation resistant layer. These structures are not illustrated in the drawings. Like Example 15, a glue layer consisting of a blend or a suitable polymer is used to tightly adhere a heat deformation layer to metal. The basic structures would be: Metal/Adhesive layer/Glue layer/Deformation resistant layer; Metal/Adhesive layer/Glue layer/Deformation Resistant layer/Heat Sealable layer; or Metal/Adhesive layer/Glue layer (blend)/Deformation resistant layer/Glue layer (blend)/Sealable layer.

Examples 28–31 illustrate functional examples with polypropylene as the deformation resistant layer. Like Examples 15, 26 and 27, a glue layer consisting of a blend of a styrene-ethylene-butylene-styrene block copolymer, a hydrocarbon resin and a low density polyethylene is used to tightly adhere the polypropylene deformation resistant layer to the adhesive layer or the heat seal layer.

Comparative examples of the prior art along with deformation temperatures and corrosion index are shown in Table II.

A comparative analysis of Tables I and II demonstrates the damage that occurs to the plastic coated shielding tape of the prior art as measured by the number of corrosion spots counted on a 4 in$^2$ sample. It also demonstrates the need for a deformation resistant layer having a deformation temperature of at least about 270° F. and tight adhesion to prevent the occurrence of bare spots on the surface of the tape and the attendant potential for corrosion thereon.

Examples 1–6 in Table II illustrate that damage can occur to coatings having generally good adhesion to aluminum but having generally low melting point.

Examples 7 and 8 illustrate that coatings of ethylene/acrylic acid graft copolymer and polypropylene have poor adhesion to aluminum: the coatings delaminate during corrosion tests resulting in complete dissipation of the underlying aluminum.

Examples 9–11 in Table II illustrate that damage to lower melting point coatings on metal can occur through a deformation resistant layer. Without tight adhesion between a deformation layer and a metal adhesive layer, or with bonds between the two that are water sensitive, corrosion can occur at the defects in the adhesive coating on the metal.

Example 12 illustrates the non-functionality of this patented construction for corrosion protection: metal completely dissipated during the corrosion test; the coating has insufficient deformation resistance.

Example 13 illustrates the need for tight adhesion of coatings to the metal for corrosion protection: metal completely dissipated during the corrosion test.

Bonded jacket cables, as shown in Table VIII, incorporating comparative examples of Table II have been made on commercial cable manufacturing lines under normal processing conditions.

Tables III and IV illustrate the initial bond strengths and bonds strengths after aging for 7 days in 70° C. deionized water. Two sets of numbers are given in Table III because multilayer coatings may not necessarily fail at the interface of the metal and an immediately adjacent plastic layer during bond strength tests. If the metal bond exceeds the bond of the various plastic layers to each other, then bond failure occurs at the weakest interface thereof. (The example numbers refer to those in Table I and Table II where the detailed shielding tape constructions are shown). The minimum bond strength is 2.2 lb/inch of width regardless of whether the bond strength refers to a metal/polymeric layer bond or to a polymeric layer/polymeric layer bond. For the former, corrosion resistance and mechanical performance will be deficient below the minimum bond strength. For the latter, the ability to withstand handling without delamination will also be impaired below this minimum bond strength.

From Table III, it can be seen that the judicious selection of the types and proportions of polymer compositions will provide a bond between the metal strip and adhesive layer which is stronger than the interlayer bond of the other layers of polymeric resinous materials while still providing a minimum bond strength of 2.2 lb/inch of sample width between the polymeric coating/polymeric coating bond.

As shown in Table IV, prior art examples 8–13 do not satisfy the adhesion requirement of the present invention—a minimum bond strength of 2.2 lb/inch of sample width at the metal/polymeric coating interface or the polymeric coating/polymeric coating interface.

Tables V and VI show that the multilayer coatings have improved ultimate tensile strength, elongation, and tear strength when compared to coatings of the presently known art. The example numbers refer only to the improved coating structure shown in Table I and not to the coated metal structure.

Tables VII and VIII show actual cable data wherein the cables are made using several shielding tapes described in Tables I and II. The same example numbers are used.

Table IX shows that the improved coatings of this invention have increased resistance to adverse effects of filling and flooding compounds. The attribute is also of benefit in extending the service life of filled cables.

Table X shows that the connector stability to coated metal is improved with the improved coating since the increase in resistance over the initial value is smaller.

Table XI shows that the electrical breakdown strength and resistance to permeation is improved with the new coating. The electrical strength of the new coating may be used to advantage in filled cable designs by elimination of the standard electrical barrier which is wrapped about the core. The reduced rates of permeation may serve to improve corrosion resistance.

TABLE I

THIS INVENTION

| Example Number | Layer Construction | Deformation Temperature, °F. | Corrosion Index |
|---|---|---|---|
| 1(C) | EAA (1)/Al/EAA (1)/50% EAA (1)-50% PP/EAA (1) | 291 | 0 |
| 2(C) | EAA (1)/Al/EAA (1)/40% EAA (1)-60% PP/EAA (1) | 327 | 0 |
| 3(C) | EAA (1)/Al/EAA (1)/30% EAA (1)-70% PP/EAA (1) | 327 | 0 |
| 4(C) | EAA (1)/Al/EAA (1)/50% LDPE-50% PP/EAA (1) | 327 | 0 |
| 5(C) | EAA (1)/Al/EAA (1)/100% Nylon/EAA (1) | >390 | 0 |
| 6(B) | 50% EAA (2)-50% PP/Al/50% EAA (2)-50% PP | 331 | 0 |
| 7(C) | EAA (1)/TPS/EAA (1)/50% HDPE-50% PP/EAA (1) | 325 | 0 |
| 8(C) | EAA (1)/Al/EAA (1)/34% HDPE (1)-64% PP-2% LDPE/EAA (1) | 325 | 0 |
| 9(C) | EAA (1)/Al/EAA (1)/39% HDPE (1)-59% PP-2% LDPE/EAA (1) | 320 | 0 |
| 10(C) | EAA (1)/Al/EAA (1)/44% HDPE (1)-54% PP-2% LDPE/EAA (1) | 309 | 0 |
| 11(C) | EAA (1)/Al/EAA (1)/49% HDPE (1)-49% PP-2% LDPE/EAA (1) | 304 | 0 |
| 12(C) | EAA (1)/Al/EAA (1)/19% HDPE (1)-19% EAA (1)-2% LDPE-60% PP/EAA (1) | 316 | 0 |
| 13(B) | EAA (1)/Al/EAA (1)/70% HDPE-30% PP | 277 | 0 |
| 14(C) | 0.254 mm Jacket of EAA (1)/Al/EAA (1)/35% HDPE (1)-65% PP/EAA (1) | 325 | 0 |
| 15(B) | EAA (1)/Al/EAA (1)/50% EAA (1)-50% PP/PP | 327 | 0 |
| 16*(B) | EAA (1)/Al/EAA (1)/90% HDPE-10% PP/EAA (1) | 255 | 94 |
| 17*(C) | EAA (1)/Al/EAA (1)/80% HDPE-20% PP/EAA (1) | 262 | 86 |
| 18*(C) | EAA (1)/Al/EAA (1)/70% EAA (1)-30% PP/EAA (1) | 231 | 35 |
| 19*(C) | EAA (1)/Al/EAA (1)/60% EAA (1)-40% PP/EAA (1) | 267 | 7 |
| 20(C) | EAA (3)/Cu/EAA (3)/Nylon/EAA (1) | >390 | 0 |
| 21(C) | Ionomer/Al/Ionomer/50% PP-50% HDPE | 309 | 0 |
| 22(B) | 70% EAA (1)-30% HDPE/Al/70% EAA (1)-30% HDPE/50% PP-50% HDPE | 325 | 0 |
| 23(A) | EAA (1)/Al/EAA (1) (Irradiated 10 megarads) | >410 | 0 |
| 24(A) | EAA (1)/Al/EAA (1) (Irradiated 20 megarads) | >410 | 0 |
| 25(A) | EAA (1)/Al/EAA (1)/LDPE (Irradiated 5 megarads) | >410 | 0 |
| 26(C) | EAA (1)Al/EAA (1)/50% EVA-50% EAA/VCP | 320 | 0 |
| 27(C) | EAA (1)Al/EAA (1)/EVA/VCP/EVA/EAA (1) | 322 | 0 |
| 28(C) | EAA (1)/Al/EAA (1)/70% Nylon-30% EAA (4) EAA (1) | >410 | 0 |
| 29(C) | EAA (1)/Al/EAA (1)/K-E-P (1)/PP/K-E-P (2)/-EAA (1) | 334 | 0 |
| 30(C) | EAA (1)/Al/EAA (1)/K-E-P (2)/PP/K-E-P (3)/-EAA (1) | 333 | 0 |
| 31(C) | EAA (1)/Al/EAA (1)/K-E-P (3)/PP/K-E-P (4)/- | 330 | 0 |

TABLE I-continued

THIS INVENTION

| Example Number | Layer Construction | Deformation Temperature, °F. | Corrosion Index |
|---|---|---|---|
| | EAA (1) | | |

*Samples prepared for comparison
1-All blend percentages on weight basis
Al-Electrical Grade Aluminum Layer (8 mils thick)
EAA (1)-Ethylene/Acrylic Acid Copolymer, 8% by weight Acrylic Acid, 5.5 MI
EAA (2)-Ethylene/Acrylic Acid Copolymer, 12% by weight Acrylic Acid, 10 MI
EAA (3)-Ethylene/Acrylic Acid Copolymer, 8% by weight Acrylic Acid with 0.1% Copper Stabilizer
EAA (4)-Ethylene/Acrylic Acid Copolymer, 8% by weight Acrylic Acid, 2 MI
PP-polypropylene, Melt Flow 9.0, Density 0.905
PP (1)-Polypropylene, Melt Flow 7.0, Density 0.198
HDPE-High Density Polyethylene, Melt Index 3.6-4.4, Density 0.963-0.967
HDPE (1)-High Density Polyethylene, Melt Index 5.0, Density 0.964
LDPE-Low Density Polyethylene, Melt Index 1.95, Density 0.919
Nylon-Nylon 6
EVA-Ethylene/Vinyl Acetate Copolymer-28% by weight Vinyl Acetate
Ionomer-Ethylene/Methacrylic Acid Copolymer with the acid partially neutralized by metal ions
(A)Samples prepared by extrusion coating and post-heated
(B)Samples prepared by lamination of blown film and post-heated
(C)Samples prepared by lamination of cast film and post-heated
VCP-Vinylidene Chloride Polymer
TPS-Tin Plate Steel Layer, 6 mils thick
Cu-Copper Layer, 5 mils thick
K-E-P (1)-Blend of 35% Kraton ® (1), 35% Escorez (2), LDPE
K-E-P (2)-Blend of 35% Kraton ® (2), 35% Escorez (1), LDPE
K-E-P (3)-Blend of 35% Kraton ® (2), 35% Escorez (2), LDPE
Kraton ® (1)-Kraton ® 1652 Styrene-ethylene-butylene-styrene block copolymer from Shell
Escorez (1)-Escorez ® 2101 hydrocarbon resin containing aliphatic and aromatic structures from Exxon
LDPE-low density polyethylene, Melt Index 2.0, Density, 0.920
Escorez (2)-Escorez ® 5320 hydrogenated hydrocarbon resins from Exxon
Kraton (2)-Kraton ® 1650 styrene-ethylene-butylene-styrene block copolymers from Shell

TABLE II

PRIOR ART

| Example Number | Layer Construction | | Deformation Temperature, °F. | Corrosion Index |
|---|---|---|---|---|
| 1(U) | LDPE/Adh (1)/Al/Adh (1)/LDPE | US 3,809,603 | 223 | 77 |
| 2(U) | Ternary Copolymer/Al/Ternary Copolymer | US 3,849,591 | 226 | 60 |
| 3(A) | LDPE/EAA (1)/Al/EAA (1) | US 3,856,756 | 223 | 92 |
| 4(A) | HDPE/EAA (1)/Al/EAA (1) | US 3,507,978 | 252 | 14 |
| 5(A) | EAA (1)/Al/EAA (1) | US 3,233,036 | 216 | 99 |
| | | US 3,795,540 | | |
| 6(U) | EVA/Ionomer/Al/Ionomer/EVA | **Ishikawa et al | 234 | 39 |
| | | US 3,950,605 | | |
| 7(C) | EAA (2)/Al/EAA (2) | US 3,868,433 | 216 | * |
| 8(C) | PP/Al/PP | US 3,790,694 | 325 | * |
| | | US 3,379,824 | | |
| | | US 3,622,683 | | |
| 9(C) | 0.127 mm PP/EAA (2)/Al/EAA (1) | US 3,325,589 | 325 | 41 |
| | | US 3,790,694 | | |
| 10(C) | 0.025 mm PSTR/EAA (1)/Al/EAA (1) | US 3,325,589 | >408 | 36 |
| 11(C) | 0.0762 mm PSTR/EAA (1)/Al/EAA (1) | US 3,325,589 | >408 | 38 |
| 12(C) | LDPE/Al/LDPE | GB 886,417 | 223 | * |
| 13(C) | PSTR/Al/EAA (1) | US 3,321,572 | >408 | * |

*Metal completely dissipated during test: Corrosion resistance insufficient
**H. Ishikawa, et al "A New Method of Manufacturing Laminated Aluminum Polyethylene Sheath Cable", 21st International Wire and Cable Symposium, Atlantic City, New Jersey, 1972, p. 153.
Al - Electrical Grade Aluminum Layer, 8 mils thick
LDPE - Low Density Polyethylene Layer
Adh (1) - Thermoplastic Adhesive Layer, as disclosed in U.S. Pat. No. 3,809,603
Ternary Copolymer - Ethylene, Vinyl Acetate and Methacrylate or Glycidyl Acrylate Layer
EAA (1) - Ethylene/Acrylic Acid (Random) Copolymer Layer
HDPE - High Density Polyethylene Layer, Melt Index 6.0-9.0, Density 0.962-0.966
EVA - Ethylene/Vinyl Acetate Copolymer Layer
(A)Samples prepared by extrusion coating
(C)Samples prepared by lamination of cast film
(U)Method of sample preparation unknown
Ionomer - Ethylene/Methacrylic Acid Copolymer Layer with the acid partially neutralized by metal ions
EAA (2) - Ethylene/Acrylic Acid Graft Copolymer Layer
PSTR - Polyethylene Terephthalate

TABLE IV

PRIOR ART

| Table II Example No. | Bond Strength in Lb/In of Width | | | |
|---|---|---|---|---|
| | To Metal | | To Plastic | |
| | Initial | After Aging | Initial | After Aging |
| 1* | 9.48 | 11.40 | >9.48 | >11.40 |
| 2* | 15.80 | 8.21 | >15.80 | >8.21 |
| 3 | 12.00 | 13.50 | 9.39 | 10.60 |
| 4* | 14.78 | 18.26 | >14.78 | >18.26 |
| 5* | 17.60 | 19.49 | >17.60 | >19.49 |
| 6** | >10.10 | >14.59 | 10.10 | 14.59 |

TABLE IV-continued

PRIOR ART

| Table II Example No. | Bond Strength in Lb/In of Width | | | |
|---|---|---|---|---|
| | To Metal | | To Plastic | |
| | Initial | After Aging | Initial | After Aging |
| 7* | 5.9 | 8.18 | >5.9 | >8.18 |
| 8 | 0 | 0 | 0 | 0 |
| 9 | 17.50 | 20.10 | 0.30 | 0 |
| 10 | 17.46 | 19.23 | 0.88 | 0 |
| 11 | 17.43 | 18.96 | 0.45 | 0 |
| 12* | 1.10 | 0 | >1.10 | >0 |
| 13A (PSTR side) | 0.37 | 0 | 0 | 0 |
| 13B* (EAA side) | 15.97 | 17.45 | >15.97 | >17.45 |

*Separation occurs at metal/polymeric layer interface; bond strength at polymeric layer/polymer layer interface greater than that at metal/polymeric layer interface.
**Separation occurs at polymer layer/polymeric layer interface; bond strength at metal/polymeric layer interface greater than that at polymeric layer/polymer layer interface.

TABLE III

THIS INVENTION

| Table I Example No. | Bond Strength in lb/in of Width | | | |
|---|---|---|---|---|
| | To Metal | | To Plastic | |
| | Initial | After Aging | Initial | After Aging |
| 1 | 17.49 | 19.98 | 7.19 | 9.00 |
| 2 | 17.49 | 20.04 | 2.29 | 2.40 |
| 3* | 17.49 | 19.98 | 1.19 | 1.50 |
| 4 | 17.38 | 19.78 | 5.72 | 5.70 |
| 5 | 17.49 | 20.00 | 10.19 | 6.49 |
| 6 | 6.09 | 6.45 | 6.18 | 6.42 |
| 7 | 33.97 | 28.47 | 9.39 | 11.20 |
| 8 | 14.19 | 13.29 | 2.31 | 2.20 |
| 9 | 13.99 | 13.60 | 2.95 | 2.99 |
| 10 | 13.99 | 14.70 | 5.19 | 4.69 |
| 11 | 14.19 | 14.50 | 6.89 | 6.80 |
| 12 | 14.19 | 14.59 | 2.95 | 2.90 |
| 13 | 17.49 | 19.58 | 18.48 | 18.52 |
| 14 | 16.61 | 18.37 | 2.35 | 2.31 |
| 15 | 17.49 | 19.29 | 5.08 | 5.06 |
| 16* | 19.69 | 20.06 | 18.00 | 20.99 |
| 17* | 19.69 | 20.17 | 16.39 | 13.49 |
| 18* | 19.58 | 20.09 | 19.18 | 15.69 |
| 19* | 19.62 | 20.13 | 9.99 | 9.92 |
| 20 | 24.64 | 23.10 | 9.37 | 9.42 |
| 21 | 17.24 | 17.38 | 3.15 | 3.19 |
| 22 | 18.23 | 20.06 | 6.38 | 6.45 |
| 23 | 21.21 | 22.11 | 18.59 | 19.58 |
| 24 | 14.70 | 16.57 | 15.29 | 15.25 |
| 25 | 17.75 | 20.90 | 9.39 | 9.48 |
| 26 | 18.48 | 20.13 | 3.98 | 3.92 |
| 27 | 18.52 | 20.31 | 8.48 | 8.60 |
| 28 | 21.70 | 22.50 | 13.35 | 11.47 |
| 29 | 21.65 | 22.72 | 10.10 | 9.75 |
| 30 | 21.49 | 21.75 | 14.60 | 14.20 |
| 31 | 20.50 | 21.72 | 12.90 | 13.94 |

*Comparative Examples

TABLE V

THIS INVENTION

| Table I Example No. | Direction | Tensile (PSI) | | Elongation (Percent) | Elmendorf Tear (gms) |
|---|---|---|---|---|---|
| | | Yield | Ultimate | | |
| 1 | MD | 1362 | 3803 | 580 | 634 |
| | CD | 1376 | 3065 | 555 | 672 |
| 2 | MD | 1405 | 3647 | 605 | 525 |
| | CD | 1348 | 3150 | 656 | 717 |
| 4 | MD | 1873 | 3661 | 685 | 307 |
| | CD | 1845 | 3349 | 685 | 442 |
| 5 | MD | 1844 | 6598 | 600 | 166 |
| | CD | 2554 | 6471 | 540 | 150 |
| 8 | MD | 1958 | 4002 | 770 | 480 |
| | CD | 1873 | 3661 | 795 | 576 |
| 9 | MD | 1944 | 3746 | 775 | 295 |
| | CD | 1930 | 3661 | 755 | 499 |
| 10 | MD | 2001 | 3760 | 695 | 262 |
| | CD | 1916 | 3533 | 750 | 486 |
| 11 | MD | 1873 | 3689 | 760 | 352 |
| | CD | 1831 | 3548 | 800 | 538 |
| 12 | MD | 1958 | 4030 | 715 | 416 |
| | CD | 1802 | 3505 | 740 | 589 |

TABLE VI

PRIOR ART

| Table II Example No. | | Yield | Ultimate | | |
|---|---|---|---|---|---|
| 1 | MD | 1603 | 2696 | 300 | 170 |
| | CD | 1504 | 2242 | 450 | 190 |
| 5 | MD | 1050 | 2540 | 450 | 244 |
| | CD | 1007 | 2597 | 560 | 308 |

Tensile and Elongation: ASTM D-822
MD - Machine Direction
CD - Cross Machine Direction
Elmendorf Tear: ASTM D-1922

TABLE VII

ACTUAL CABLE DATA THIS INVENTION

| Table I Example No. | Cable Size | Jacket Melt Temperature, °F. | Line Speed Feet/ Min | Corrosion Index |
|---|---|---|---|---|
| 2 | 100 pr, 22 AWG, Air Core | 429 | 59.0 | 0 |
| 5 | 150 pr, 24 AWG, Air Core | 424 | 49.9 | 0 |
| 5 | 75 pr, 24 AWG, Filled Core | 449 | 100.0 | 0 |
| 9 | 100 Pr, 22 AWG, Air Core | 455 | 80.0 | 0 |

TABLE VIII

ACTUAL CABLE DATA PRIOR ART

| Table II Example No. | Cable Size | Jacket Melt Temperature, °F. | Line Speed Feet/ Min | Corrosion Index |
|---|---|---|---|---|
| 3 | 25 pr, 22 AWG, Air Core | 390 | 100.0 | 49 |
| 4 | 100 pr, 22 AWG, Air Core | 390 | 59.0 | 36 |
| 5 | 25 pr, 22 AWG, Air Core | 390 | 100.0 | 97 |
| 5 | 150 pr, 22 AWG, Air Core | 424 | 49.9 | 76 |
| 5 | 75 pr, 24 AWG, Filled Core | 449 | 100.0 | 22 |
| 5 | 100 pr, 22 AWG, Air Core | 429 | 59.0 | 78 |

TABLE IX

FILLER AND FLOODANT RESISTANCE, THIS INVENTION

| Coated Metal Structure[A] | Percent Swell[B] | |
|---|---|---|
| | Filler[C] | Floodant[D] |
| EAA (1)/50% EAA (1)-50% PP/EAA (1)/Al/EAA (1) 50% EAA (1)-50% PP/EAA (1) | 5.2 | 10.2 |
| EAA (1)/40% EAA (1)-60% PP/EAA (1)/Al/EAA (1)/40% EAA (1)-60% PP/EAA (1) | 5.2 | 11.1 |

TABLE IX-continued
FILLER AND FLOODANT RESISTANCE, THIS INVENTION

| Coated Metal Structure[A] | Percent Swell[B] | |
|---|---|---|
| | Filler[C] | Floodant[D] |
| EAA (1)/50% HDPE-50% PP/EAA (1)/Al/EAA (1)/50% HDPE-50% PP/EAA | 5.0 | 10.1 |
| *Example 5 (Table II) | 10.5 | 13.8 |

[A] See Table I for Description of Materials
[B] Weight increase of the coatings after exposure to filler and floodant at 115.5° C. for 2 seconds
[C] Mixture of 92% petrolatum and 8% polyethylene
[D] Mixture of 75% petrolatum and 25% atactic polypropylene
*Not an example of this invention

TABLE X
CONNECTOR STABILITY, THIS INVENTION

| Table I Example No. | Resistance in Milliohms[1] | |
|---|---|---|
| | Initial | After Cycling[2] |
| 2 | 0.6663 | 1.187 |
| 10 | 0.6912 | 1.702 |
| 18 | 0.7353 | 1.7825 |
| 5[3] | 0.6750 | 2.727 |

[1] Two connectors were attached to 50 mm by 140 mm sample of coated metal; the resistance of the assembly was measured with a Kelvin Bridge
[2] Resistance after 50 −40 to +60° C. temperature cycles, each cycle of 8 hours duration
[3] Example No. 5 from Table II; not an example of this invention.

TABLE XI
COATING PROPERTIES

| | This Invention[1] | Prior Art[2] |
|---|---|---|
| Breakdown Strength, Kilovolts/Cm | 1360 | 1100 |
| Permeability | | |
| $N_2$, cc-mil/24 hrs/100 in$^2$/Atm | 334 | 525 |
| $O_2$, cc-mil/24 hrs/100 in$^2$/Atm | 1130 | 1580 |
| $H_2O$, g-mil/24 hrs/100 in$^2$/Atm | 0.74 | 1.28 |

[1] Example 10, Table I
[2] Example 5, Table II

While certain representative embodiments have been shown in detail for the purpose of illustrating the invention, it will be apparent to those skilled in the art that various changes and modifications can be made without departing from the spirit and scope of the invention.

What is claimed is:

1. An improved corrosion resistant cable shielding tape comprising
   (1) a metal strip having tightly and directly adhered to one side thereof a first adhesive layer composed of a copolymer of ethylene and from about 2 to about 20 percent based on copolymer weight of an ethylenically unsaturated carboxylic acid; and
   (2) a first deformation resistant layer composed of a polymeric resinous material tightly adhered to said first adhesive layer, said first deformation resistant layer having a deformation temperature of at least about 270° F.,
   wherein the adhesive bond between said metal strip and said first adhesive layer and between said first adhesive layer and said first deformation resistant layer is at least 2.2 pounds per inch of shielding tape width after aging for seven (7) days in deionized water maintained at a temperature of 70° C.

2. The cable shielding tape of claim 1 wherein an adhesive/heat seal layer of thermoplastic polymeric resinous material having both good metal bonding and heat seal characteristics is tightly adhered to the opposite side of said metal strip, the adhesive bond between said metal strip and said adhesive/heat seal layer being at least 2.2 pounds per inch of shielding tape width after aging for seven (7) days in deionized water maintained at a temperature of 70° C.

3. The cable shielding tape of claim 1 wherein a second deformation resistant layer of polymeric resinous material is tightly adhered to the opposite side of said metal strip, said second deformation resistant layer having a deformation temperature of at least 270° F., the adhesive bond between said metal strip and said second deformation resistant layer being at least 2.2 pounds per inch of shielding tape width after aging for seven (7) days in deionized water maintained at a temperature of 70° C.

4. The cable shielding tape of claim 3 wherein a heat seal layer of thermoplastic polymeric resinous material having good heat seal characteristics is adhered to said second deformation resistant layer on the side of said second deformation resistant layer opposite to that which said metal strip is adhered.

5. The cable shielding tape of claim 3 wherein a second adhesive layer composed of a copolymer of ethylene and from about 2 to about 20 percent based on copolymer weight of an ethylenically unsaturated carboxylic acid is disposed between and tightly and directly adhered to said metal strip and said second deformation resistant layer, the adhesive bond between said metal strip and said second adhesive layer and between said second adhesive layer and said second deformation resistant layer being at least 2.2 pounds per inch of shielding tape width after aging for seven (7) days in deionized water maintained at a temperature of 70° C.

6. The cable shielding tape of claim 1 wherein a heat seal layer of thermoplastic polymeric resinous material having good heat seal characteristics is adhered to said first deformation resistant layer on the side of said first deformation resistant layer opposite to that which said first adhesive layer is adhered.

7. The cable shielding tape of claim 6 wherein a second deformation resistant layer composed of polymeric resinous material is tightly adhered to the opposite side of said metal strip, said second deformation resistant layer having a deformation temperature of at least about 270° F., the adhesive bond between said metal strip and said second deformation resistant layer being at least 2.2 pounds per inch of shielding tape width after aging for seven (7) days in deionized water maintained at a temperature of 70° C.

8. The cable shielding tape of claim 6 wherein an adhesive/heat seal layer of thermoplastic polymeric resinous material having both good metal bonding and heat seal characteristics is tightly adhered to the opposite side of said metal strip, the adhesive bond between said metal strip and said adhesive/heat seal layer being at least 2.2 pounds per inch of shielding tape width after aging for seven (7) days in deionized water maintained at a temperature of 70° C.

9. The cable shielding tape of claim 7 wherein a heat seal layer of thermoplastic polymeric resinous material having good heat seal characteristics is adhered to said second deformation resistant layer on the side of said second deformation resistant layer opposite to that which said metal strip is adhered.

10. The cable shielding tape of claim 5 wherein a heat seal layer of thermoplastic polymeric resinous material having good heat seal characteristics is adhered to said first deformation resistant layer on the side of said first deformation resistant layer opposite to that which said first adhesive layer is adhered.

11. The cable shielding tape of claim 10 wherein a heat seal layer of thermoplastic polymeric resinous material having good heat seal characteristics is adhered to said second deformation resistant layer on the side of said second deformation resistant layer opposite to that which said second adhesive layer is adhered.

12. The cable shielding tape of claim 1, 2, 3, 4 or 5 wherein a first glue layer of thermoplastic polymeric resinous material is disposed between and tightly and directly adhered to said first adhesive layer and said first deformation resistant layer, the adhesive bond between said first adhesive layer and said first glue layer and between said first glue layer and said first deformation resistant layer being at least 2.2 pounds per inch of shielding tape width after aging for seven (7) days in deionized water maintained at a temperature of 70° C.

13. The cable shielding tape of claim 6, 7, 8, 9, 10, or 11 wherein a first glue layer of thermoplastic polymeric resinous material is disposed between and tightly and directly adhered to said first adhesive layer and said first deformation resistant layer, the adhesive bond between said first adhesive layer and said first glue layer and between said first glue layer and said first deformation resistant layer being at least 2.2 pounds per inch of shielding tape with after aging for seven (7) days in deionized water maintained at a temperature of 70° C.

14. The cable shielding tape of claim 13 wherein a second glue layer of thermoplastic polymeric resinous material is disposed between and tightly and directly adhered to said first deformation resistant layer and said heat seal layer, the adhesive bond between said first deformation resistant layer and said second glue layer and between said second glue layer and said heat seal layer being at least 2.2 pounds per inch of shielding tape width after aging for seven (7) days in deionized water maintained at a temperature of 70° C.

15. An improved cable adapted for use in supplying electrical power and communications comprising a core of at least one insulated conductor, a shield surrounding said core comprising
(1) a metal strip having tightly and directly adhered to one side thereof a first adhesive layer composed of a copolymer of ethylene and from about 2 to about 20 percent based on copolymer weight of an ethylenically unsaturated carboxylic acid; and
(2) a first deformation resistant layer composed of a polymeric resinous material tightly adhered to said first adhesive layer, said first deformation resistant layer having a deformation temperature of at least about 270° F. and positioned inwardly in the direction of said core and an outer plastic jacket surrounding said shield, the adhesive bond between said metal strip and said first adhesive layer and between said first adhesive layer and said first deformation resistant layer being at least 2.2 pounds per inch of shielding tape width after aging for seven (7) days in deionized water maintained at a temperature of 70° C.

16. The improved cable of claim 1 wherein a second deformation resistant layer of polymeric resinous material is tightly adhered to the opposite side of said metal strip, said second deformation resistant layer having a deformation temperature of at least about 270° F. and positioned outwardly from said metal strip in the direction of said outer plastic jacket, the adhesive bond between said metal strip and said second deformation resistant layer being at least 2.2 pounds per inch of shielding tape width after aging for seven (7) days in deionized water maintained at a temperature of 70° C.

* * * * *

UNITED STATES PATENT AND TRADEMARK OFFICE
CERTIFICATE OF CORRECTION

PATENT NO. : 4,292,463

DATED : September 29, 1981

INVENTOR(S) : Kenneth E. Bow, et al.

It is certified that error appears in the above—identified patent and that said Letters Patent is hereby corrected as shown below:

Col. 5, line 3, "it" should read -- is --;

Col. 8, line 56, "carbonxyl" should read -- carboxyl --;

Col. 10, line 20, "layer 86" should read -- layer 85 --;

Col. 12, line 61, "material," should read -- material; --;

Col. 16, line 45, "bonds" should read -- bond --;

Col. 22, line 22 in TABLE VI, "ASTM D-822" should read -- ASTM D-882 --;

Col. 22, TABLE VII and VIII, please insert a -- , -- after "ACTUAL CABLE DATA";

Col. 25, line 27, "with" should read -- width --;

Col. 26, line 25, in Claim 16 "The improved cable of claim 1" should read -- The improved cable of claim 15 --.

Signed and Sealed this

Twenty-third Day of March 1982

[SEAL]

Attest:

GERALD J. MOSSINGHOFF

Attesting Officer   Commissioner of Patents and Trademarks